United States Patent [19]

Chikiri et al.

[11] Patent Number: 5,727,777
[45] Date of Patent: Mar. 17, 1998

[54] SPIRAL HANGER FOR A CABLE AND METHOD OF INSTALLING A CABLE USING THE SAME

[75] Inventors: Kazuyoshi Chikiri, Fukuchiyama; Yukihiro Higashi, Sakai, both of Japan

[73] Assignee: Hien Electric Industries, Ltd., Osaka, Japan

[21] Appl. No.: 629,385

[22] Filed: Apr. 8, 1996

[30] Foreign Application Priority Data

Aug. 30, 1995 [JP] Japan .................... 7-243934

[51] Int. Cl.⁶ .................................. E21C 29/16
[52] U.S. Cl. .................. 254/134.3 R; 254/134.3 CL; 254/134.3 PA; 269/46
[58] Field of Search .............. 269/46; 254/134.3 R, 254/134.3 PA, 134.3 CL, 134.3 SC; 29/433, 435

[56] References Cited

U.S. PATENT DOCUMENTS

| | | |
|---|---|---|
| 2,215,541 | 9/1940 | Buchanan et al. |
| 2,694,101 | 11/1954 | Shuhart. |
| 2,744,707 | 5/1956 | Peterson ............... 254/134.3 CI |
| 2,999,894 | 9/1961 | Binder. |
| 3,185,443 | 5/1965 | Eitel ....................... 254/134.3 CI |
| 3,185,444 | 5/1965 | Eitel ....................... 254/134.3 CI |
| 3,814,383 | 6/1974 | Jackson .................. 254/134.3 CI |
| 3,941,914 | 3/1976 | Oishi et al. . |
| 4,019,715 | 4/1977 | Vugrek ................... 254/134.3 R |
| 4,191,334 | 3/1980 | Bulanda et al. ........... 24/16 PB |
| 5,040,771 | 8/1991 | Spell ...................... 254/134.3 CI |

*Primary Examiner*—Timothy V. Eley
*Assistant Examiner*—Lee Wilson
*Attorney, Agent, or Firm*—Armstrong, Westerman Hattori, McLeland & Naughton

[57] ABSTRACT

In a method of hanging a cable by using spiral hangers on a messenger wire installed between a pair of electric utility poles, one end of a spiral hanger and a leading end of a pull rope are connected to a leading pulley in the vicinity of one of the electric utility poles. A spiral hanger having an inner diameter greater than the sum of the outer diameter of the messenger wire and the outer diameter of the cable is transported toward the other of the electric utility poles while surrounding the messenger wire and the pull rope. The other end of the spiral hanger is connected to one end of a succeeding spiral hanger by using a joint sleeve, and this operation is repeated. When the leading pulley arrives at the other of the electric utility poles, the spiral hangers are fixed to the messenger wire using fixing devices. After that, the pull rope is pulled so as to pull the cable connected to the tail end of the pull rope through the spiral hangers. With this operation, the cable can be installed by work performed only in the vicinity of the electric utility poles.

4 Claims, 6 Drawing Sheets

SPIRAL HANGER FOR A CABLE AND METHOD OF INSTALLING A CABLE USING THE SAME

BACKGROUND OF THE INVENTION

1. Field of the Invention

The present invention relates to a spiral hanger for hanging a cable on a messenger wire, and a method of installing a cable using such a spiral hanger.

2. Description of Related Art

Conventionally, a hanger system like that shown in FIG. 9 has been commonly used to hang a cable from a messenger wire and fix the cable thereto. The procedure for installing a cable using such a hanger system 100 will be described with reference to FIG. 10. First, a plurality of pulleys 128 are attached to a messenger wire 102 which has been installed between electric utility poles 101a and 101b. A pull rope 106 is then passed through the pulleys 128 and is connected to a winch 103. The winch 103 is then operated so as to cause a cable 119 connected to the pull rope 106 to run between the electric utility poles 101a and 101b. Subsequently, hangers 108 shown in FIG. 9 are attached to the messenger wire 102 at intervals of 50-60 cm and the pulleys 128 are removed. These operations are performed by a worker 104 who dangles in midair between the electric utility poles 101a and 101b. This is called midair dangling work. Therefore, the worker must have experience, and this work is time consuming and dangerous. Also, an accident happened in which a pulley 128 fell down and injured a passer-by. Accordingly, a strong desire exists to solve the above-described problems.

Also, when a cable is supported by using hangers, there is the possibility that the hangers may fall down or slide sideways due to external causes so that the proper support of the cable cannot be maintained and the characteristics of the cable are adversely affected.

SUMMARY OF THE INVENTION

In view of the foregoing problems, an object of the present invention is to provide a novel spiral hanger for hanging a cable.

Another object of the present invention is to provide a method of installing a cable using the spiral hanger which can be performed safely without the need for midair dangling work and which can prevent the hanger from falling down or sliding sideways.

The present invention provides a spiral hanger with a joint sleeve which is made of metal and has a through hole having a cross section which decreases at the center of the joint sleeve. One end of the spiral hanger is halfway inserted into the through hole of the joint sleeve.

The spiral hanger preferably comprises a core wire made of metal, and a layer of synthetic resin which covers the core wire. The joint sleeve is preferably made of aluminum.

The present invention also provides a method of hanging a cable by using spiral hangers on a messenger wire installed between a pair of electric utility poles. In the method of the present invention, one end of a spiral hanger and a leading end of a pull rope are connected to a leading pulley in the vicinity of one of the electric utility poles. A spiral hanger having an inner diameter greater than the sum of the outer diameter of the messenger wire and the outer diameter of the cable is transported toward the other of the electric utility poles while surrounding the messenger wire and the pull rope. The other end of the spiral hanger is joined to one end of a succeeding spiral hanger by using a joint sleeve, and this operation is repeated. When the leading pulley arrives at the other of the electric utility poles, the spiral hangers are fixed to the messenger wire using fixing devices. After that, the pull rope is pulled so as to pull the cable connected to the tail end of the pull rope through the spiral hangers. With this operation, the cable can be installed by work performed only in the vicinity of the electric utility poles.

Preferably, the first and last ones of the spiral hangers are fixed to the messenger wire.

Preferably, the leading pulley comprises a roller which freely rolls along the messenger wire, a saddle for holding the leading end of the pull rope which is inserted into the saddle, a holder for holding one end of the spiral hanger which is inserted into the holder, and a weight hung down from the lower portion of the leading pulley.

In this case, the leading pulley preferably comprises a detachable side plate, and the side plate is removed when the leading pulley is placed on the messenger wire.

Also, it is preferable to provide a plurality of weights having different weights. In this case, these weights are selectively attached to the leading pulley.

In the spiral hanger according to the present invention, a joint sleeve is attached to one end of each spiral hanger in advance. Accordingly, it is unnecessary to work at a height while holding small parts. Also, there is no possibility of parts falling and hitting a passer-by. Since one end of the spiral hanger is halfway inserted into the through hole of the joint sleeve in which the cross section of the through hole is decreased at the center of the joint sleeve, there is no possibility of the joint sleeve coming off the spiral hanger.

In the method of installing a cable according to the present invention, it is unnecessary to perform dangerous midair dangling work, and all work can be performed in the vicinity of electric utility poles. Accordingly, the attachment of the spiral hangers serving as cable holders to the messenger wire can be performed safely and easily.

Also, the method according to the present invention can eliminate the work of attaching and detaching jigs such as a pulley to a messenger wire. Therefore, it is possible to eliminate the possibility of parts falling down and hitting a passer-by.

Since each of the spiral hangers is fixed to an adjacent joint sleeve by crimping and the spiral hangers are fixed to the messenger wire by using fixing devices, the spiral hangers are prevented from sliding or falling.

The use of a leading pulley completely prevents the turning of the pull rope or twisting between the pull rope and the messenger wire, which would otherwise occur during the installation of the spiral hanger. Also, connecting the leading end of the pull rope and one end of the spiral hanger can be simplified.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF PREFERRED EMBODIMENT

An embodiment according to the present invention will now be described in detail with reference to the accompanying drawings.

Figure 1:
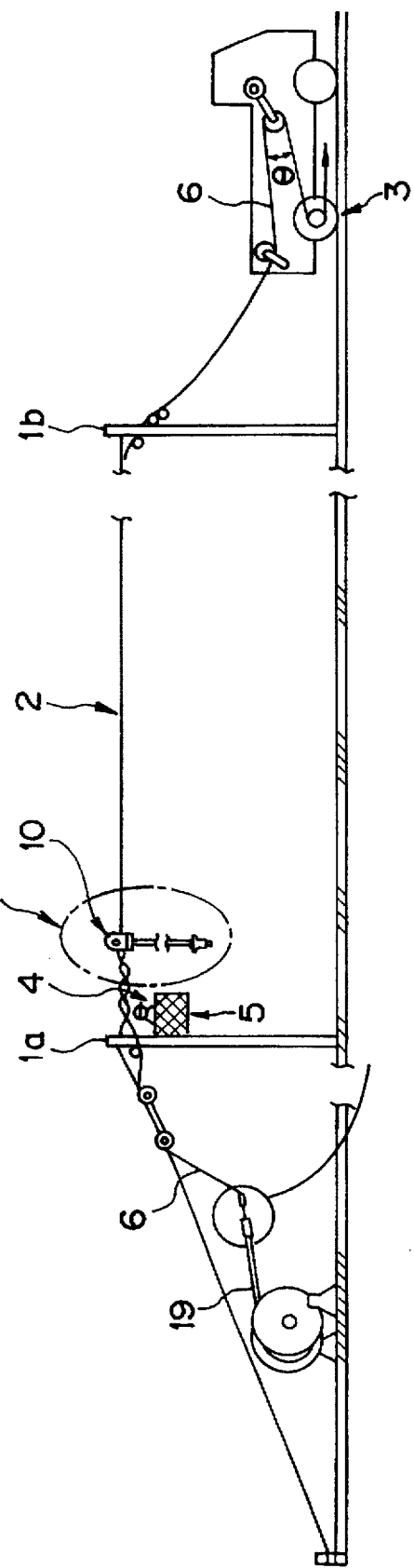
FIG. 1 is a side view schematically showing an embodiment of a method of installing a cable using spiral hangers according to the present invention.
Figure 2:
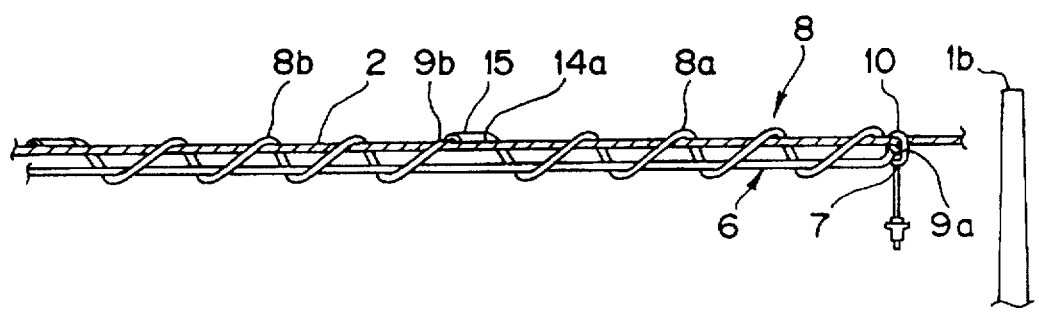
FIG. 2 is a partial side view schematically showing the state in which spiral hangers according to the present invention are connected to a frame body of a leading pulley, and are connected to each other via a joint sleeve.

As shown in FIGS. 1 and 2, a messenger wire 2 is previously installed between a pair of electric utility poles 1a and 1b using a winch 3. A worker 4 in a bucket 5 disposed in the vicinity of one electric utility pole 1a performs installation work. The leading end 7 of a pull rope 6 and one end 9a of a first spiral hanger 8a for hanging a cable are coupled to a leading pulley 10. This leading pulley 10 is attached to the messenger wire 2 in such a way that the leading pulley 10 may roll freely on the messenger wire 2. Connected to the other end 14a, which is opposite the one end 9a of the first spiral hanger 8a, is one end 9b of a second spiral hanger 8b.

Figure 3A:
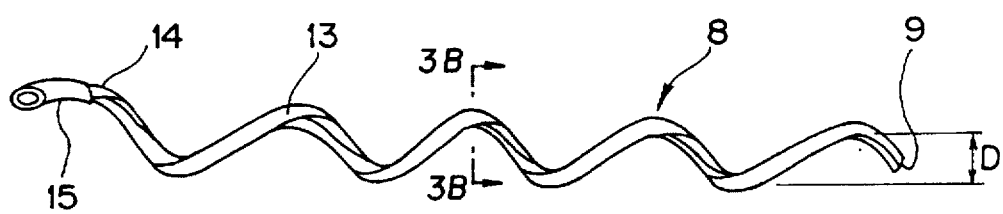
FIG. 3A is a side view of a spiral hanger used in the method of the present invention.
Figure 3B:
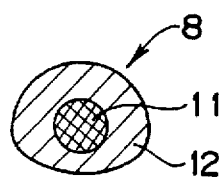
FIG. 3B is a sectional view taken along line A—A in FIG. 3A.
Figure 4:
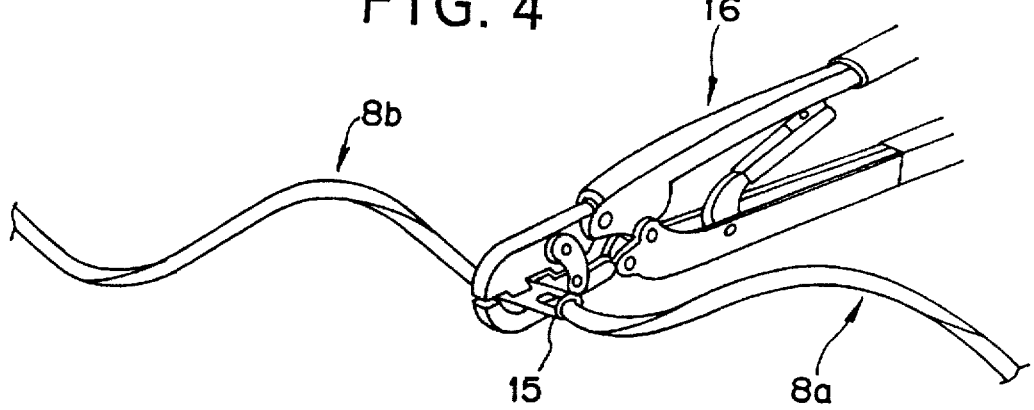
FIG. 4 is a perspective view showing an operation of connecting spiral hangers by using a joint sleeve in the method of the present invention.
Figure 5:
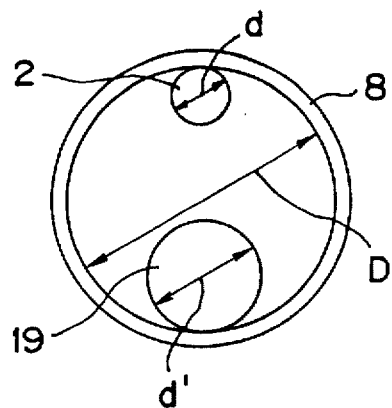
FIG. 5 is a sectional view showing the state in which a cable is hung from a messenger wire using spiral hangers in the method of the present invention.

As shown in FIGS. 3A and 3B, each spiral hanger 8 includes a core wire 11 and a layer 12 of a synthetic resin material which covers the core wire 11. The spiral hanger 8 is bent in a spiral shape 13 extending in the longitudinal direction, and is cut in a predetermined length of 75 cm or 100 cm. Although nothing is attached to one end 9 of the spiral hanger 8, a joint sleeve 15 is attached to the other end 14 such that the other end 14 is inserted halfway therein. The joint sleeve 15 is crimped by a crimping tool 16 shown in FIG. 4 so as to reduce the time and labor at the construction site. The inner spiral diameter D of the spiral hanger 8 is set so as to be greater than the sum of the outer diameter d of the messenger wire 2 and the outer diameter d' of the cable 19, as shown in FIG. 5, preferably equal to or greater than 200% of the sum.

Figure 6A:
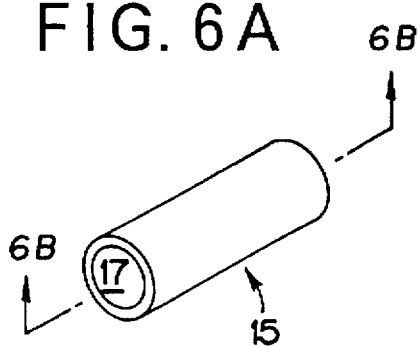
FIG. 6A is a perspective view of a joint sleeve used in the method of the present invention.
Figure 6B:
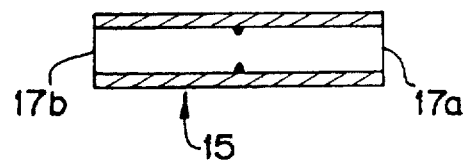
FIG. 6B is a sectional view taken along line B—B in FIG. 6A.

The joint sleeve 15 used in the method according to the present invention has a shape as shown in FIGS. 6A and 6B and is made of metal. In the present embodiment, aluminum is used. A through hole 17 is longitudinally formed in the joint sleeve 15. The through hole 17 has a cross section corresponding to the cross section of the spiral hanger 8 shown in FIG. 3A. In the present embodiment, the through hole 17 is straight, and it is crimped onto the spiral hanger 8 shown in FIG. 3A such that the other end 14 of the spiral hanger 8 is inserted halfway into the through hole 17.

After the leading end 7 of the pull rope 6 and one end 9a of the spiral hanger 8 are connected to the leading pulley 10, the spiral hanger 8 is transported toward the other electric utility pole 1b such that the spiral hanger 8 surrounds the messenger wire 2 and the pull rope 6. Since the spiral hanger 8 has a large inner spiral diameter D as described above, the spiral hanger 8 is smoothly transported in cooperation with the action of the leading pulley 10.

Transportation is performed until the other end 14a of the first spiral hanger 8a reaches the former location of the one end 9a of the spiral hanger 8, as shown in FIG. 2. Since the joint sleeve 15 is attached to the other end 14a of the first spiral support 8a such that the other end 14a is received by a first half 17a of the through hole 17, the second half 17b of the through hole 17 is still empty. Subsequently, one end of a second spiral hanger 8b is inserted into the second half 17b of the through hole 17, and the joint sleeve 15 is then crimped to the second spiral hanger 8b using the crimping tool 16 shown in FIG. 4. This connection and the above-described transportation are repeated so that the attachment of the spiral hangers 8 proceeds.

Figure 7:
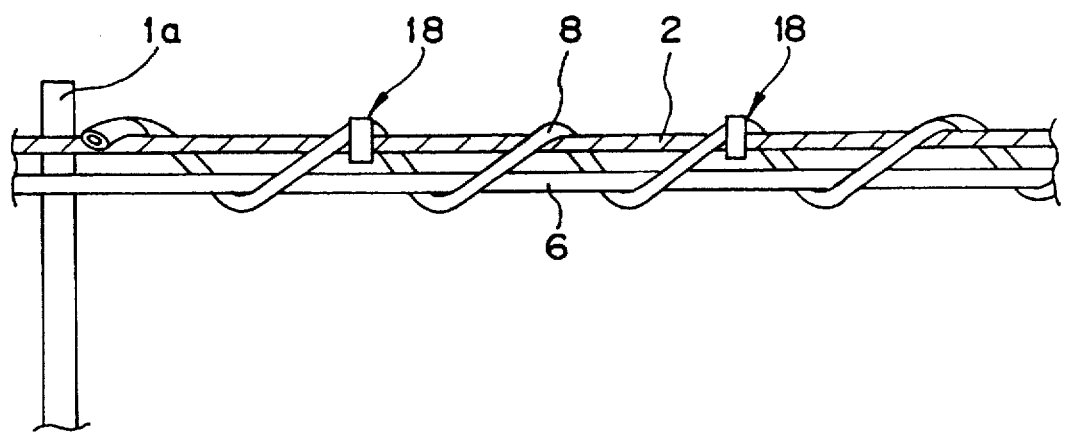
FIG. 7 is a side view schematically showing the state in which fixing devices are attached to the messenger wire in the method of the present invention.

The above-described work is continued until the leading pulley 10, to which the one end 9a of the first spiral hanger 8a and the leading end 7 of the pull rope 6 are connected, reaches the other electric utility pole 1b in FIG. 2. As a result, all the spiral hangers 8 . . . (see FIG. 7) are disposed on the messenger wire 2 between the electric utility poles 1a and 1b. Subsequently, the first spiral hanger 8a and the last spiral hanger 8i are fixed to the messenger wire 2 using fixing devices 18 as shown in FIG. 7.

It is preferred that two or three fixing devices 18 be used to fix the spiral hangers 8a and 8i. In the present embodiment, the fixing devices 18 are winding bands formed of metal or synthetic resin. However, C-shaped springs which are fitted onto the messenger wire 2 and the spiral hanger 8 may also be used.

In this state, the one end 9a of the first spiral hanger 8a and the leading end 7 of the pull rope 6 are removed from the leading pulley 10 in the vicinity of the electric utility pole 1b. Subsequently, the leading pulley 10 is removed from the messenger wire 2, and the leading end 7 of the pull rope 6 is connected to the winch 3. A cable 19 is then connected to the tail end of the pull rope 6 in the vicinity of the electric utility pole 1a, as shown in FIG. 1. When the pull rope 6 is wound by the winch 3, the cable 19 is pulled trough the spiral hangers 8. By the above-described procedures, the method of installing a cable of the present invention is completed.

Figure 8A:
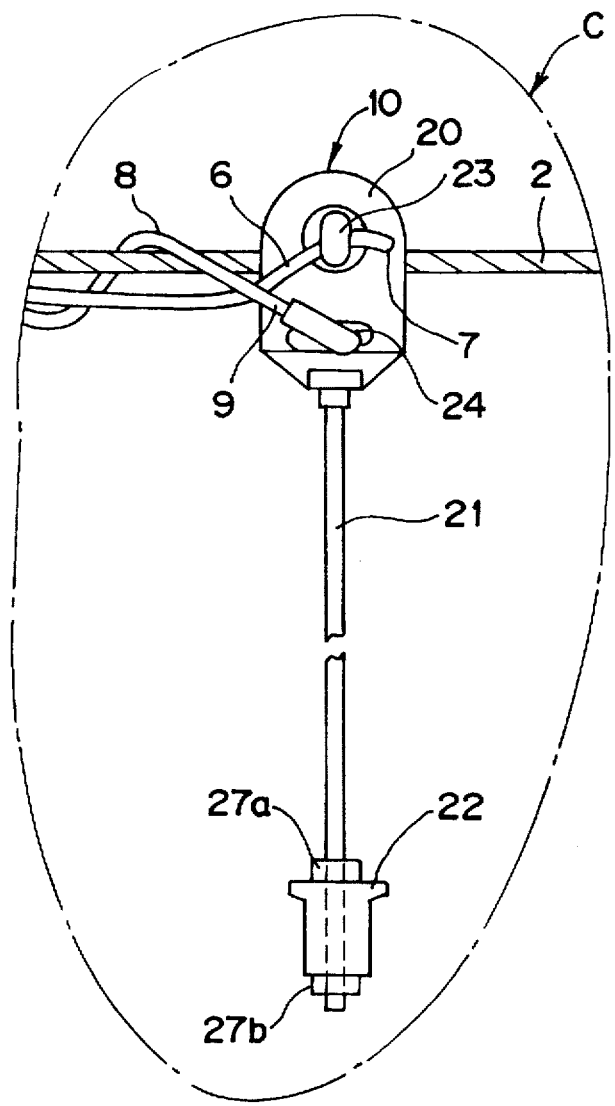
FIG. 8A is an enlarged side view of the leading pulley denoted by reference symbol C in FIG. 1.
Figure 8B:
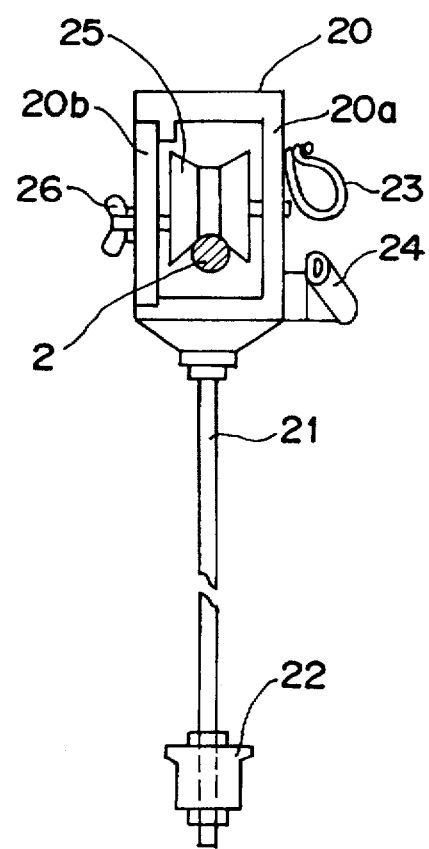
FIG. 8B is a view of the leading pulley as viewed from the left side thereof in FIG. 8A in the state in which the pull rope and the spiral hanger are omitted.
Figure 9:
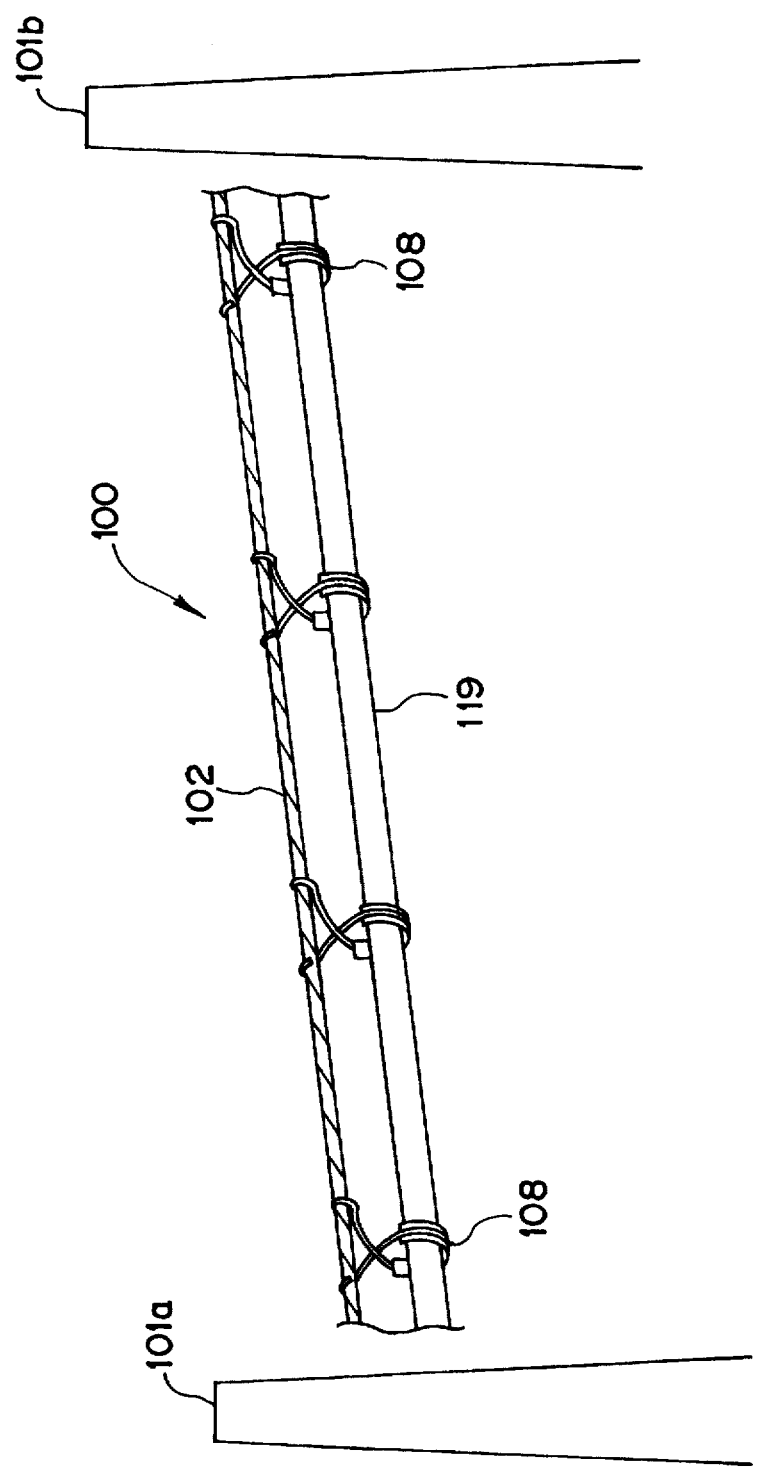
FIG. 9 is a partial side view schematically showing the state in which a cable is hung from a messenger wire by a conventional hanger system.
Figure 10:
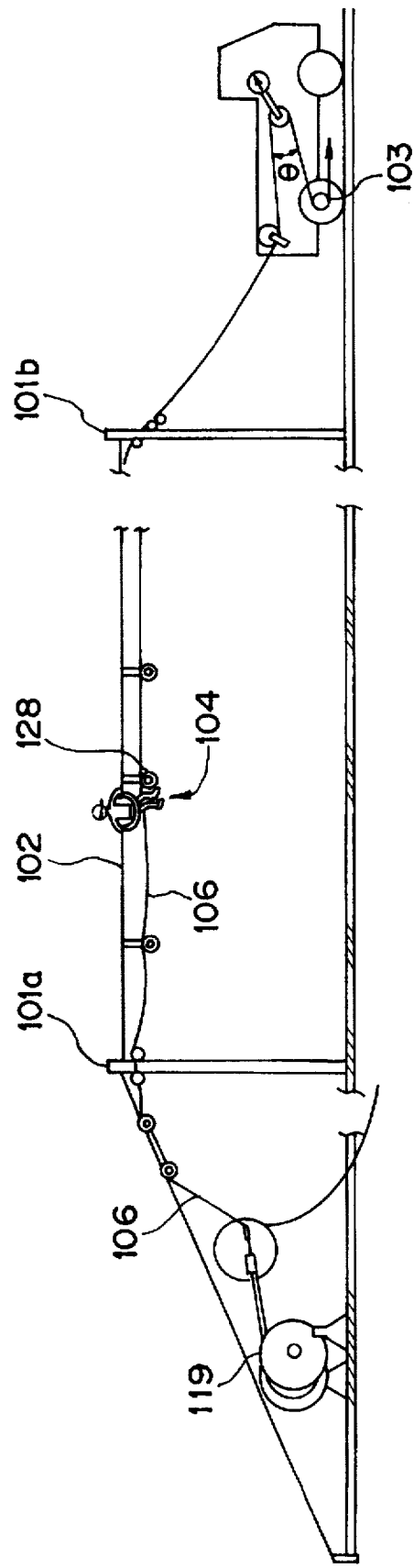
FIG. 10 is a schematic side view for explaining the conventional hanger system.

Next, the structure of the leading pulley 10 of the present invention will be described in detail. As shown in FIG. 8B, the leading pulley 10 is composed of a frame body 20, and a weight 22 which hangs down from the frame body 20 via a lower connection rod 21. A saddle 23 and a holder 24 are attached to the outer side surface 20a of the frame body 20 which is located on the right side in FIG. 8B. The saddle 23 holds the leading end 7 of the pull rope 6 which is inserted into the saddle 23. The holder 24 holds one end 9 of the spiral hanger 8 which is inserted into the holder 24.

A roller pulley 25 which rolls on the messenger wire 2 is provided in the frame box 20, as shown in FIG. 8B. Since the left side plate 20b of the frame body 20 is detachable, the roller pulley 25 is detachably fixed to the frame 20 using butterfly nut 26 which is screwed onto a shaft, whereby the roller pulley 25 is supported by the messenger wire 2.

Since the weight 22 is fixed to the lower connection rod 21 of the frame body 20, the leading pulley 10 is stabilized and thereby prevented from turning about the messenger wire 2. A pair of nuts 27a and 27b are screwed to the lower connection rod 21 at locations above and below the weight 22 so as to fix the weight 22 in place. Therefore, the weight 22 can be easily exchanged by removing the nut 27b. In the present embodiment, the weight 22 has a weight of 85 g. However, when external conditions such as wind change, an optimum weight suitable for the conditions is selected from a plurality of different kinds of weights having different weights.

The leading pulley 10 having the above-described structure facilitates work for connecting the pull rope 6 and the spiral hanger 8 for hanging a cable, and allows stable transportation. Therefore, the leading pulley 10 is useful in the method of the present embodiment.

Obviously, numerous modifications and variations of the present invention are possible in light of the above teachings. It is therefore to be understood that within the scope of the appended claims, the present invention may be practiced otherwise than as specifically described herein.

What is claimed is:

1. A method of hanging a cable by using a series of spiral hangers on a messenger wire installed between a pair of electric utility poles, said method comprising the steps of:

providing a leading pulley which comprises a roller which freely rolls along said messenger wire, a saddle for holding a leading end of a pull rope which is inserted into said saddle, a holder for holding a first end of a first spiral hanger of said series of spiral hangers, said first spiral hanger being inserted into said holder, and a weight hung down from a lower portion of said leading pulley;

connecting said first end of said first spiral hanger of said series of spiral hangers and said leading end of said pull rope to said leading pulley in a vicinity of a first electric utility pole of said pair of electric utility poles;

transporting said first spiral hanger having an inner diameter greater than a sum of an outer diameter of said messenger wire and an outer diameter of said cable toward a second electric utility pole of said pair of electric utility poles while surrounding said messenger wire and said pull rope;

joining a second end of said first spiral hanger of said series of spiral hangers to a first end of each of a predetermined number of succeeding spiral hanger of said series of spiral hangers by a joint sleeve until a last spiral hanger of said series of spiral hangers is joined;

fixing at least one spiral hanger of said series of spiral hangers to said messenger wire using fixing devices when said leading pulley arrives at said second electric utility pole of said pair of electric utility poles; and pulling said pull ropes so as to pull said cable connected to a tail end of said pull rope through said first through said last spiral hangers of said series of spiral hangers, whereby said cable is installed by work performed only in said vicinity of said pair of electric utility poles.

2. The method of hanging said cable on said messenger wire according to claim 1, wherein said first and said last spiral hangers of said series of spiral hangers are fixed to said messenger wire.

3. The method of hanging said cable on said messenger wire according to claim 1, wherein said leading pulley comprises a detachable side plate, and said side plate is removed when said leading pulley is placed on said messenger wire.

4. The method of hanging said cable on said messenger wire according to claim 1, wherein a plurality of weights are provided with each weight of said plurality of weights having a different mass, and each weight of said plurality of weights is selectively attached to said leading pulley.

* * * * *